United States Patent
Rott et al.

(10) Patent No.: US 9,164,574 B2
(45) Date of Patent: *Oct. 20, 2015

(54) SWITCHING A CONTROL DEVICE IN A VEHICLE NETWORK TO SLEEP MODE WHEN VELOCITY IS ABOVE A THRESHOLD AND SWITCHING TO AN OPERATING MODE AFTER A NUMBER OF RECEIVED MESSAGES

(71) Applicants: VOLKSWAGEN AG, Wolfsburg (DE); AUDI AG, Ingolstadt (DE)

(72) Inventors: Alexander Rott, Bad Abbach (DE); Jörg Speh, Braunschweig (DE); Carsten Schanze, Wolfsburg (DE)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/534,646

(22) Filed: Nov. 6, 2014

(65) Prior Publication Data

US 2015/0067372 A1 Mar. 5, 2015

Related U.S. Application Data

(63) Continuation of application No. 13/256,332, filed as application No. PCT/EP2010/001895 on Mar. 22, 2010, now Pat. No. 8,909,963.

(30) Foreign Application Priority Data

Mar. 31, 2009 (DE) .................. 10 2009 015 197

(51) Int. Cl.
*G06F 1/32* (2006.01)
*H04L 12/12* (2006.01)
(Continued)

(52) U.S. Cl.
CPC .............. *G06F 1/3296* (2013.01); *H04L 12/12* (2013.01); *H04L 12/40039* (2013.01);
(Continued)

(58) Field of Classification Search
CPC ....... G06F 1/26; G06F 1/3203; G06F 1/3206; G06F 1/3296; H04L 12/12; H04L 12/40039; H04L 67/12; H04L 2012/40273; Y02B 60/34; Y02B 60/32
USPC .......................... 713/323; 701/36, 45, 49, 121
See application file for complete search history.

(56) References Cited

U.S. PATENT DOCUMENTS

| 5,081,586 A | 1/1992 | Barthel et al. |
| 5,757,773 A | 5/1998 | Tsuji |

(Continued)

FOREIGN PATENT DOCUMENTS

| CN | 1659498 A | 8/2005 |
| DE | 4425419 C1 | 12/1995 |

(Continued)

OTHER PUBLICATIONS

Search Report for International Patent Application No. PCT/EP2010/001895; Oct. 27, 2010.

(Continued)

*Primary Examiner* — Thomas Lee
*Assistant Examiner* — Danny Chan
(74) *Attorney, Agent, or Firm* — Barnes & Thornburg LLP

(57) ABSTRACT

A control device for a vehicle network, having a microprocessor and a transceiver. The control device can be switched off or switched to a sleep mode during a previously defined state or event during the operation of the motor vehicle and/or the control device can be awakened from the sleep mode during a previously defined state or event during the operation. The disclosed embodiments also relate to a method for operating a vehicle network.

15 Claims, 4 Drawing Sheets

(51) Int. Cl.
*H04L 12/40* (2006.01)
*H04L 29/08* (2006.01)
*G06F 1/26* (2006.01)

(52) U.S. Cl.
CPC ............... *H04L 67/12* (2013.01); *G06F 1/26* (2013.01); *G06F 1/3203* (2013.01); *G06F 1/3206* (2013.01); *H04L 2012/40273* (2013.01); *Y02B 60/32* (2013.01); *Y02B 60/34* (2013.01)

(56) References Cited

U.S. PATENT DOCUMENTS

| | | | |
|---|---|---|---|
| 5,892,893 A | 4/1999 | Hanf et al. | |
| 6,195,597 B1 | 2/2001 | Yamada | |
| 6,307,280 B1 | 10/2001 | Harrington et al. | |
| 6,484,082 B1 | 11/2002 | Millsap et al. | |
| 6,718,214 B1 | 4/2004 | Schoettle et al. | |
| 6,728,892 B1 | 4/2004 | Silvkoff et al. | |
| 6,886,352 B2 | 5/2005 | Yoshinori et al. | |
| 7,457,301 B2 | 11/2008 | Furuta et al. | |
| 7,603,577 B2 | 10/2009 | Yamaji et al. | |
| 7,797,803 B2 | 9/2010 | Falb et al. | |
| 8,281,167 B2 | 10/2012 | Nakamura et al. | |
| 8,423,242 B2 | 4/2013 | Ochiai et al. | |
| 8,514,065 B2 | 8/2013 | Huebl | |
| 2002/0006139 A1 | 1/2002 | Kikkawa et al. | |
| 2003/0070022 A1 | 4/2003 | Ito | |
| 2004/0010349 A1 | 1/2004 | Perez et al. | |
| 2004/0174909 A1 | 9/2004 | Marais et al. | |
| 2005/0075760 A1 | 4/2005 | Moisel et al. | |
| 2005/0160301 A1 | 7/2005 | Disser | |
| 2005/0179322 A1 | 8/2005 | Flick | |
| 2006/0168378 A1 | 7/2006 | Muth | |
| 2007/0079161 A1 | 4/2007 | Gupta | |
| 2007/0230484 A1 | 10/2007 | Hu et al. | |
| 2008/0042856 A1 | 2/2008 | Power | |
| 2008/0201023 A1 | 8/2008 | Berglund | |
| 2008/0294319 A1 | 11/2008 | Baijens et al. | |
| 2008/0319607 A1 | 12/2008 | Schindler et al. | |
| 2009/0103503 A1 | 4/2009 | Chhabra | |
| 2010/0070138 A1 | 3/2010 | Schoening et al. | |
| 2010/0127857 A1 | 5/2010 | Kilmurray et al. | |

FOREIGN PATENT DOCUMENTS

| | | |
|---|---|---|
| DE | 19611944 A1 | 10/1997 |
| DE | 19611945 C1 | 11/1997 |
| DE | 19960079 A1 | 6/2000 |
| DE | 10033257 A1 | 1/2002 |
| DE | 10250616 C1 | 11/2003 |
| DE | 10358584 A1 | 7/2004 |
| DE | 10339421 A1 | 4/2005 |
| DE | 202005016196 U1 | 2/2007 |
| EP | 0992400 A2 | 4/2000 |
| FR | 2917555 A3 | 12/2008 |
| WO | 9946888 A1 | 9/1999 |
| WO | 03104959 A1 | 12/2003 |
| WO | 2008067927 A1 | 6/2008 |

OTHER PUBLICATIONS

International Preliminary Report on Patentability for International Patent Application No. PCT/EP2010/001895; Nov. 1, 2011.

SWITCHING A CONTROL DEVICE IN A VEHICLE NETWORK TO SLEEP MODE WHEN VELOCITY IS ABOVE A THRESHOLD AND SWITCHING TO AN OPERATING MODE AFTER A NUMBER OF RECEIVED MESSAGES

PRIORITY CLAIM

This patent application is a continuation of U.S. patent application Ser. No. 13/256,332, filed 3 Nov. 2011, which is a U.S. National Phase of International Patent Application No. PCT/EP2010/001895, filed 22 Mar. 2010, which claims priority to German Patent Application No. 10 2009 015 197.4, filed 31 Mar., 2009, the disclosures of which are incorporated herein by reference in their entirety.

FIELD

Disclosed embodiments relate to a control device for a vehicle network and to a method for operating a vehicle network.

BACKGROUND

Control devices for a vehicle network such as, for example, CAN, FlexRay or LIN have been known for a long time. The control devices have in common the fact that they have a microprocessor and a transceiver and are suitably connected to the corresponding bus lines. Switching on an operating signal causes all the control devices to be switched on here. This operating signal is usually terminal 15 (KL 15) in the case of a motor vehicle with an internal combustion engine, that is to say the means of switching on the ignition. Furthermore, control devices are known which, when the ignition is switched off, are switched into a sleep mode in order to wake up, and if appropriate to awaken or switch on further control devices, when a specific signal occurs. Such a control device is, for example, the control device for a central locking system. A problem in modern motor vehicles is the increased electrical energy requirement which also brings about an increased fuel consumption in vehicles with internal combustion engines.

SUMMARY

The disclosed embodiments are based on the technical problem of making available a control device for a vehicle network and a method for operating a vehicle network by means of which the electrical energy requirement is reduced.

The means of solving the technical problem is obtained through the subject matters having the features of patent claims 16 and 21. Further advantageous refinements of the disclosed embodiments can be found in the dependent claims.

For this purpose, the control device for a vehicle network comprises a microprocessor and a transceiver, wherein the control device is switched off or can be switched into a sleep mode in the case of a previously defined state or event during operation of the motor vehicle. As a result of this, individual control devices or groups of control devices can also be switched into an energy-saving mode during operation of the motor vehicle. The operating signal is here, for example, the terminal 15 signal or a starting signal in the case of an electric vehicle. In a first alternative, the term operation therefore comprises a state of the motor vehicle with the ignition switched on. In a second alternative, the term operation can additionally comprise a state of the motor vehicle with the ignition switched off.

In this context, the term state is understood to be a driving state or vehicle state of the motor vehicle. Such states can, for example, be determined by evaluation of sensor signals.

All the control devices may be first switched on with the operating signal and then selectively switched off or switched into the sleep mode. Alternatively it is possible to provide that individual control devices are not switched on when the operating signal is switched on but are instead switched straight into a sleep mode and then selectively awakened by a network message during operation. Furthermore, it is possible to provide that the control device is firstly switched on with the operating signal, then switched into the sleep mode by a previously defined event and/or state and then can be awakened again by a further previously defined event and/or a further state. In a network, the individual alternatives can also be combined here. All the measures bring about a saving in electrical energy.

Awakening here means activation or switching on of the control device.

In one disclosed embodiment, the event for switching the control device into the sleep mode or for switching off or for awakening is at least one network message which is optionally transmitted by a master control device.

In another disclosed embodiment, the control device comprises a module for detecting network messages, which module controls the switching on and/or the sleep mode and/or the switching off.

The module is optionally connected on the input side to the output of a receiver of the transceiver and on the output side to a control logic for the microprocessor and/or to the transceiver. In particular, the module is connected on the output side to the microprocessor and/or to a driver of the transceiver and/or to a control logic of the transceiver.

As a result, the transceiver and/or the microprocessor can be correspondingly switched off or switched into an energy-saving mode. It is therefore possible, for example in a sleep mode, for the driver for transmitting to be switched off and the receiver to be switched to a passive listening state which then waits for an awakening network message.

In yet another disclosed embodiment, the module is integrated into the transceiver or in the microprocessor or is embodied as a separate component.

In a further disclosed embodiment, the module is integrated into the microprocessor. In this context, a coprocessor function of the microprocessor can be executed by means of the module if a sleep mode of the microprocessor is activated. In this context, in the coprocessor function the module carries out a transmitting operation and/or receiving operation and/or an evaluation of reception messages and/or a changeover of operating mode.

In another disclosed embodiment, the module comprises at least one data mask and/or at least one DLC mask and/or at least one identifier mask.

In yet another disclosed embodiment, the module comprises at least one input and output interface, wherein external signals can be received and/or transmitted by means of the input and output interface.

In a further disclosed embodiment, the module comprises at least one output interface for outputting signals to external voltage controllers and/or at least one output interface for outputting signals for controlling the transceiver.

In another disclosed embodiment, the module comprises at least one time out timer, wherein an operating mode can be switched over by means of the module if the time out timers reach a predetermined value or 0.

In yet another disclosed embodiment, the module comprises at least one counter, wherein an operating mode can be switched over by means of the module if the counter reaches a predetermined value.

In a further disclosed embodiment, the module comprises at least one reception buffer and/or at least one transmission buffer, wherein messages can be received by means of the reception buffer and/or messages can be transmitted by means of the transmission buffer.

In another disclosed embodiment, a master control device transmits, as an event, a network message as a function of which at least one control device is switched on or off or switched into the sleep mode or awakened.

In yet another disclosed embodiment, the previously defined state is the vehicle velocity V, wherein in the case of $V>0$ or $V>V_{limit}$ at least one control device is switched off or switched into the sleep mode or awakened. A further state can be, for example, a time t. It is therefore possible to provide that after a predefined time $t_0$ after switching on of the operating signal individual control devices are switched off or are switched into the sleep mode.

The control devices which are switched off or are switched into the sleep mode or awakened are optionally comfort control devices such as, for example, a seat adjustment control device, a stationary-state heating control device or a sunroof control device.

BRIEF DESCRIPTION OF THE DRAWINGS

The disclosed embodiments will be explained below in more detail. In the drawings.

DETAILED DESCRIPTION

Figure 1:
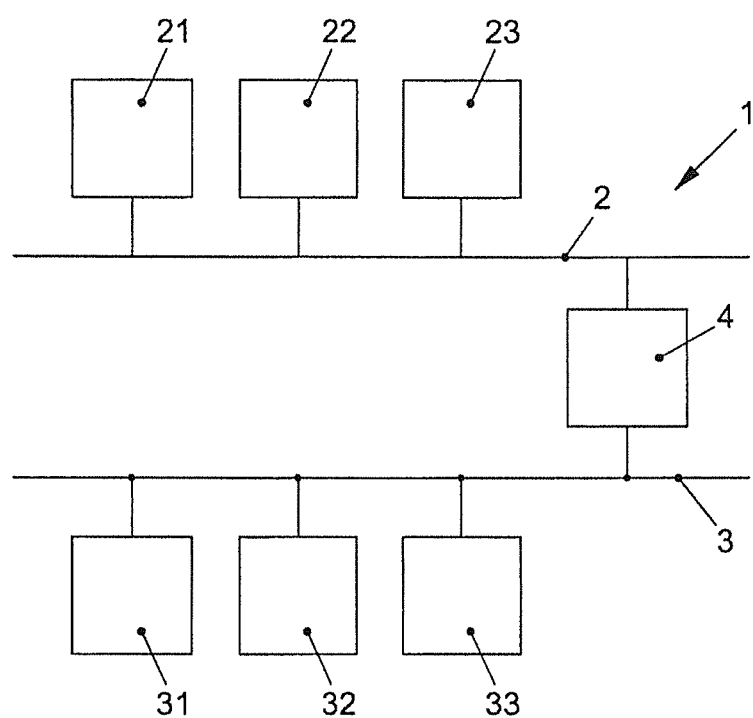
FIG. 1 shows a schematic block circuit diagram of a vehicle network.

FIG. 1 is a schematic illustration of a vehicle network 1 which is composed of two bus systems 2, 3 which are connected to one another via a control device 4. The control device 4 operates here as a gateway between the two bus systems 2, 3. The bus system 2 comprises the control devices 21-23, and the bus system 3 comprises the control devices 31-33. It is assumed here that the bus system 3 is a time-critical system such as, for example, high-speed CAN and the bus system 2 is a time-uncritical system such as, for example, Low-speed CAN, in which, in particular, comfort control devices are arranged.

In the first disclosed embodiment, all the control devices 4, 21-23, 31-33 are switched on when the KL15 ignition is switched on. Depending on a previously defined state and/or a previously defined network message, at least one control device 21-23 is then switched off or switched into a sleep mode. The difference between switched off and sleep mode is that a switched off control device is not only incapable of transmitting but can also no longer receive any network messages, that is to say it is completely excluded from the network communication. In contrast, in the sleep mode the sleeping control device 21-23 still receives network messages, even if at a relatively low power level. Possible previously defined states are the vehicle speed and/or a time period and/or further driving states or vehicle states. This is based on the realization that certain functions are usually no longer executed at a vehicle speed V>0. For example, seat adjustment is not performed during travel. Furthermore, it is possible to assume that certain settings are no longer changed after a certain time after the ignition has been switched on. Certain control devices can therefore be switched into the sleep mode or even switched off without perceptible adverse effects for comfort occurring, but the electrical power drain is reduced. The duration of the state can be evaluated here internally by the control device itself, wherein the state V>0 is optionally communicated via a network message. In this case, the state of (V>0) conditions an event (network message).

If a control device 21-23 which is in the sleep mode is then required, the control device can be awakened again by means of a previously defined network message. For this purpose, for example a master control device, optionally the control device 4 in the present case, transmits a corresponding network message to the sleeping control device 21-23. It is noted here that in the networks there is usually no direct assignment of a network message to a control device but rather the transmitting control device transmits the network message onto the bus, and all the control devices can receive the network message, with the respective control device then checking whether the network message is relevant for its own operation.

It is alternatively possible to provide that certain control devices 21-23 are in the first instance not switched on at all but rather switched into the sleep mode from the switched-off state with the terminal 15 signal. These sleeping control devices can then be analogously awakened by a network message.

In the same way that a control device 21-23 which is in the sleep mode can be awakened by a network message, a switched-on control device 21-23 can also be switched into the sleep mode or else switched off by means of a network message, and this may be done by means of a master control device.

Figure 2A:
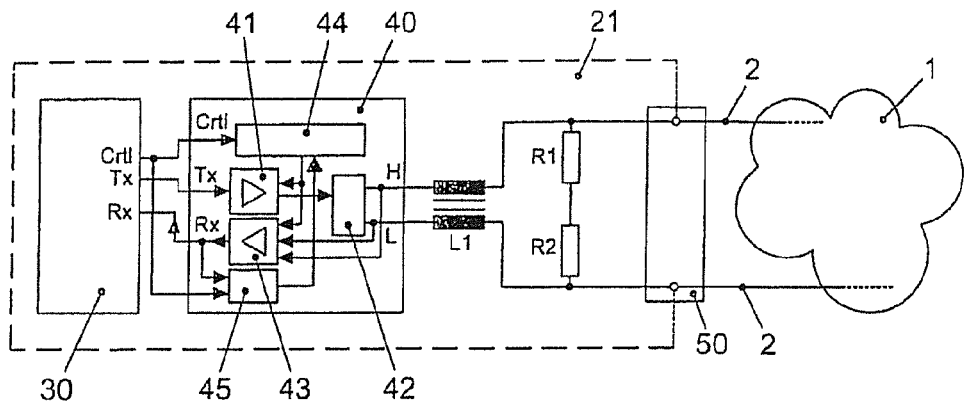
FIG. 2a shows a schematic block circuit diagram of a control device having a module which is integrated into a transceiver and has the purpose of detecting network messages.
Figure 2B:
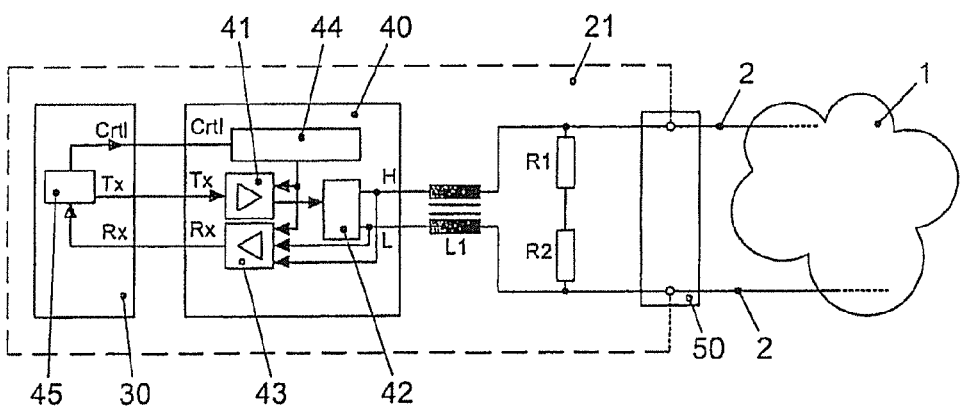
FIG. 2b shows a schematic block circuit diagram of a control device having a module which is integrated into a microprocessor and has the purpose of detecting network messages.
Figure 2C:
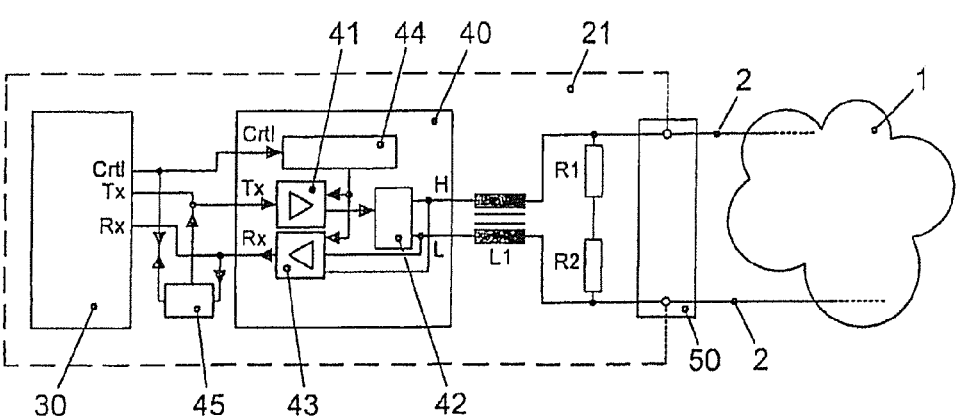
FIG. 2c shows a schematic block circuit diagram of a control device having a separate module for detecting network messages.
Figure 3:
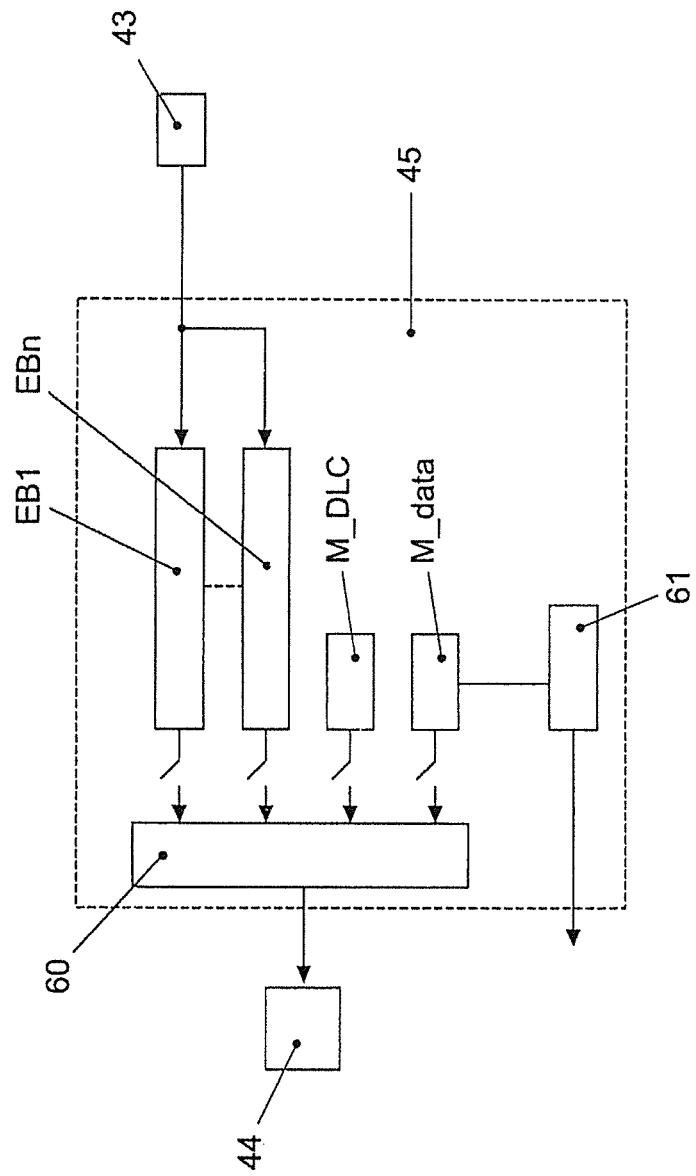
FIG. 3 shows a detailed schematic block circuit diagram of a module which is integrated into a transceiver and has the purpose of detecting network messages.

FIGS. 2a-c illustrate various embodiments of a control device 21 according to the disclosed embodiments, wherein the statements can also be transferred to the control devices 22 and 23. The control device 21 comprises a microprocessor 30, a transceiver 40 and a control device plug 50, by means of which the control device 21 is connected to the bus system 2 or the network 1. Bus terminating resistors R1, R2 and an inductive common mode suppression means L1 are arranged between the control device plug 50 and the transceiver 40. The transceiver 40 comprises a driver 41 with output stage 42 connected downstream, a receiver 43 and a control logic 44 or control logic. The driver 41 with output stage 42 connected downstream serves to transmit network messages which the microprocessor 30 makes available at its output Tx. The receiver 43 correspondingly serves for receiving network messages which are then transmitted to an Rx input of the microprocessor 30. The control logic 44 is connected on the input side to a control output Ctrl of the microprocessor 30. On the output side, the control logic 44 is connected to controlled inputs of the driver 41 and of the receiver 43. The driver 41 and the receiver 43 can then be switched into an operating mode or a sleep mode by means of the control logic 44. The aforementioned statements apply here to all three embodiments according to FIGS. 2a-c. In addition, the control device 21 comprises a module 45 for detecting network messages. For this purpose, the module 45 is connected on the input side to the output of the receiver 43 and on the output side to the microprocessor 30 (see FIG. 2a and FIG. 2c) and/or to an input of the control logic 44 (see FIG. 2b and FIG. 2c). Depending on the detected network messages, the module 45 then generates a signal for the microprocessor 30 and/or the control logic 44 in order to switch the microprocessor 30 or the driver 41 or receiver 43 into a sleep mode or an operating mode. In this context, the module 45 in FIG. 2a is an integral component of the transceiver 40. It is illustrated here in FIG. 2a that the output of the module 45 is connected to a separate input of the control logic 44. It is also possible for the output to be connected to the input of the control logic 44 which is actuated by the microprocessor 30.

The module 45 receives messages via the receiver 43, evaluates the identifiers and data content thereof with precision to the bit level and determines the number of data bytes of the messages.

There are various criteria according to which the module can generate a switching signal for changing an operating mode. The criteria can be evaluated alternatively or cumulatively here.

According to a first criterion, the module 45 compares the identifier with a mask. When the identifier and mask correspond, the module 45 generates a signal for the control logic 44 in order to switch the driver 41 or receiver 43 into a sleep mode or a desired operating mode.

According to a second criterion, the module 45 compares the data content on a bit-by-bit basis with a mask. When a predetermined or predefined bit corresponds, the module 45 generates a signal for the control logic 44 in order to switch the driver 41 or receiver 43 into a sleep mode or a desired operating mode.

According to a third criterion, the module 45 compares the number of data bytes with a mask. If the number is smaller than the number defined by the mask, the module 45 generates a signal for the control logic 44 in order to switch the driver 41 or receiver 43 into a sleep mode or a desired operating mode.

A comparison of a number of data bits can also be carried out here.

The masks for the identifier, data content and number of data bytes are stored in the module 45 or can be freely configured by the microprocessor 30 with the control output Ctrl in the module 45. In this context, it is illustrated in FIG. 2a that the control output Ctrl of the microprocessor 30 is additionally connected in a data-exchanging fashion with an input of the module 45. Of course, it is also conceivable that the microprocessor can be connected in a data-exchanging fashion to the input of the module 45 via an additional control output and an additional data line.

A data line may be embodied in a bidirectional fashion between the microprocessor 30 and the module 45. All the further data lines which are illustrated can also be embodied in a bidirectional fashion. The microprocessor 30 can therefore read out the cause of the switching over of the operating mode of the transceiver 40 from the module 45 by means of the control output Ctrl (identifier, data content, infringement of the message length). Of course, it is also conceivable that an additional data input of the microprocessor and an additional data line are used to read out the causes of the switching over of the operating mode.

In FIG. 2b, the module 45 is an integrated component of the microprocessor 30. Here, the module 45 controls the changeover of operating mode of the microprocessor 30 from one operating mode or energy-saving mode into another operating mode or energy-saving mode. The changeover of operating mode is optionally triggered by received messages.

The module 45 may be active when the microprocessor 30 is in an operating mode or energy saving mode in which no transmitting operation and/or receiving operation of messages is possible and/or no processing of data can be carried out.

The module 45 carries out the transmitting operation and/or receiving operation in such an operating mode or energy-saving mode of the microprocessor 30. In this case, the module 45 executes basic functions of the microprocessor 30 as what is referred to as a co-processor, wherein basic functions can be defined and configured in advance on a network-dependent and control-device-dependent basis. In order to transmit messages, the microprocessor is directly connected on the output side to the driver 41 in a data-exchanging fashion.

The module 45 therefore permits a state of the control device 21 in which the latter is, as it were, powered down (intermediate state). This intermediate state is characterized by a reduced energy demand and by communication which is possible despite the microprocessor 30 being switched off. In this context, an application is not executed or is only temporarily executed. Changeover of state or operating mode are triggered by messages or driving states or vehicle states which are encoded in messages. There is no need for a master control device for controlling a changeover of state or operating mode. Likewise, a master control device is not necessary for activating the intermediate state, the state can be activated by the control device 21 itself. It is possible to change over from the intermediate state into further states or operating modes.

However, the module 45 optionally exclusively carries out a transmitting operation and receiving operation including an evaluation of received messages and activation of a changeover of operating modes. The state or operating mode into which the changeover occurs is decided by the application as a function of the cause of the switching over.

For example, the module 45 can transmit messages cyclically in accordance with predefinitions of a communication protocol of the network (for example for a cyclical presence signal). It is therefore possible, for example, to indicate to further subscribers of the network that the control device 21 continues to be a communicating subscriber of the network despite an energy-saving mode.

The messages which are to be transmitted by means of the basic functions of the module 45 can be freely configured by the microprocessor 30 independently of their respective function. A configuration of the messages serves here to adapt the messages to be transmitted by the module 45 to a predetermined function of the messages (for example cyclical presence signal). Configuration of messages may take place before an energy-saving mode or sleep mode of the microprocessor 30 is activated.

Figure 4:
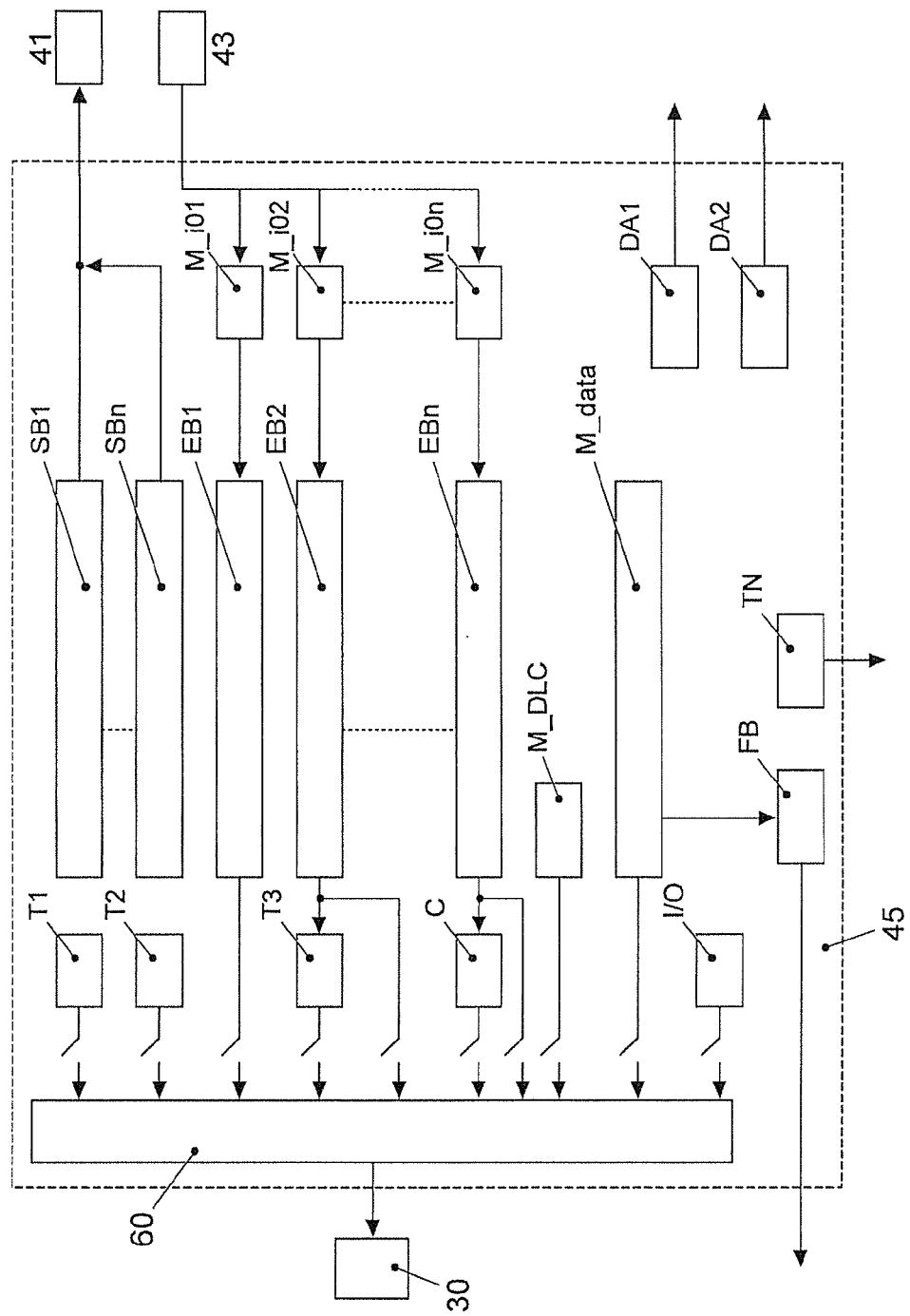
FIG. 4 shows a detailed schematic block circuit diagram of a module which is integrated into a microprocessor or embodied as a separate component and has the purpose of detecting network messages.

The module 45 receives messages, evaluates identifiers and data content with precision to the bit level and determines the number of data bytes. Furthermore, all messages can optionally be monitored for a timeout and/or a number of received messages can be counted. This will be explained later below (see for example FIG. 4).

As stated above, there are various criteria according to which the module 45 can generate a switching signal for changing an operating mode. The criteria can be evaluated alternatively or cumulatively here.

According to a first criterion, the module 45 compares the identifier with a mask. In the case of correspondence, the module 45 generates a changeover of operating mode of the microprocessor 30. The mask can be freely configured by the microprocessor 30.

According to a second criterion, the module 45 compares the data content on a bit-by-bit basis with a mask. When there is correspondence of at least one predetermined or predefined bit, the module 45 generates a changeover of operating mode of the microprocessor 30. The mask can be freely configured by the microprocessor 30.

According to a third criterion, the module 45 determines whether a data content is greater than a predetermined value. When this condition is met, the module 45 generates a changeover of operating mode of the microprocessor 30. Of course, the module 45 can also generate a changeover of operating mode if the data content is less than or equal to the predetermined value. The predetermined value can be freely configured by the microprocessor 30.

According to a fourth criterion, the module 45 compares the number of data bytes with a mask. If the number is smaller than that of the mask, the module 45 generates a changeover of operating mode of the microprocessor 30. The mask can be freely configured by the microprocessor 30.

According to a fifth criterion, the module 45 monitors received messages for timeout. If a timeout is detected, the module 45 generates a changeover of operating mode of the microprocessor 30. The timeout condition (for example a duration of a timeout) can be freely configured by the microprocessor 30.

According to a sixth criterion, the module 45 counts a number of received messages. If a predetermined number of messages is received, the module 45 generates a changeover of operating mode of the microprocessor 30. The counter value for received messages can be freely configured by the microprocessor 30.

Furthermore, the module 45 can implement a cyclical changeover of operating mode of the microprocessor 30 after the expiry of one or more timers. The timers can be freely configured by the microprocessor 30.

Furthermore, the module 45 can store the received messages in a memory unit, optionally in an FIFO memory. The microprocessor 30 can access the FIFO memory in a reading and/or deleting fashion.

Furthermore, the module 45 may have a data register which is independent of the FIFO memory and in which a received message is stored, which message has triggered one or more of the abovementioned criteria a changeover of operating mode of the microprocessor 30. The microprocessor 30 can access the stored message in a reading and/or deleting fashion.

Furthermore, the module 45 can have, optionally digital, outputs for controlling the operating modes of the transceiver 40. The module 45 can in this context access, in a data-exchanging fashion, the transceiver via, for example, the control output Ctrl of the microprocessor 30 or can have additional outputs. The operating mode of the transceiver 40 can be adapted in accordance with the current transmitting operation or receiving operation of the module 45 and therefore a further reduction in the required operating power can be achieved. If, for example, the module 45 does not transmit any messages, the module 45 optionally switches the transceiver 40 into a receive only operation (listen only). The digital outputs can be freely configured by the microprocessor 30.

Furthermore, the module 45 can have, optionally digital, outputs for controlling external voltage regulators (not illustrated) for supplying control device peripherals. If the microprocessor 30 changes into an operating mode with the active module 45, this module 45 cannot switch off, for example, control devices of a control device peripheral which are required for the current operating mode. The microprocessor 30, transceiver 40 and the parts of the control device peripherals which are required for the operation continue to be supplied with voltage. As a result it is possible to bring about a further reduction in the required operating power. The digital outputs can be freely configured by the microprocessor 30.

Furthermore, the module 45 can have a status register in which the module 45 documents the cause of the changeover of operating mode of the microprocessor 30. The microprocessor 30 can access the status register in a reading fashion. The module 45 can be active or passive in the case of such an access.

a configured message, i.e. a message with predetermined identifier, is received, or
   a configured message is received and the number of data bytes is lower than the number stored in the DLC mask M_DLC, or Furthermore, the module 45 comprises a FIFO buffer or FIFO memory FB. In this context, the reception messages which are received in the reception buffers EB1, EB2 . . . EBn are buffered in the FIFO buffer FB. Buffering of reception messages may take place at the changeover into another operating mode when the microcontroller 30 has still not made a receiving operation possible. In addition to the reception message which triggers the changeover of operating mode, further sequencing data are therefore available to the application. The FIFO buffer FB can also operate as a ring buffer. In this context, the FIFO buffer FB can buffer n reception messages. One of the n buffers or memories of the FIFO buffer FB here always stores the reception message which triggers the changeover of operating mode, and is not overwritten. If no further sequencing data are to be stored, the FIFO buffer FB can also have a buffer size which is sufficient to store only the reception message which triggers the changeover of operating mode.

Furthermore, the module 45 comprises an input and output interface (I/O pins) I/O. The input and output interface I/O may serve as an input for signals which can trigger a changeover of operating mode, for example as an input for signals which are generated by means of a switch or push button key or for signals which are dependent on a driving state or vehicle state.

In particular, signals which are dependent on a driving state or vehicle state can be transmitted to the module 45 by means of the input and output interface I/O, which module 45 can then switch off or else switch on again the microprocessor 30, not only on the basis of reception messages but also on the basis of driving states or vehicle states, or can change an operating mode.

It is therefore possible for signals, which are generated by, for example, switches/push button keys of window lifters, a mirror adjustment device or a central locking system, to be transmitted to the module 45 via, for example, the input and output interface I/O. In this way, signals of an external device for monitoring over voltage and under voltage of a battery voltage can also be transmitted. Furthermore, signals which represent vehicle states such as, for example, ignition on, ignition off, reverse travel, crash, opening of the electrical tailgate, failure of lighting means etc. can be transmitted to the module 45 in this way. The module 45 can bring about a changeover of operating mode as a function of the signals. Of course, a logic unit (not illustrated) can also process the signals which are dependent on vehicle states and generate a control signal for the module 45 from one or more signals.

The method of functioning described above will be explained using two examples:

In a first example, a control device of the parking aid is switched off (microcontroller 30 in the energy-saving mode, module 45 active). The vehicle stops during forward travel. A motor vehicle driver engages the reverse gear speed. The information "reverse gear speed engaged" is distributed in the vehicle network with a message. The module 45 of the parking aid detects this message and initiates the changeover of operating mode of the microcontroller 30, with the result that the parking aid control device can carry out its function.

Furthermore, the module 45 in the switched off state (microprocessor 30 in the energy-saving mode, module 45 active) can detect the "ignition off" state and initiate a changeover of operating mode so that the application can power down the control device.

As an alternative to the reverse gear speed, the module 45 can evaluate the vehicle speed and bring about a changeover of operating mode when a configured speed threshold is undershot.

A second example relates to a charging process of hybrid vehicles or electric vehicles. In this context, not all the control devices of a network are necessary. What is referred to as selective awakening can be implemented as follows using the module 45, with the result that only the control devices which are required for the charging process in a network are active.

For example, in the "ignition off" state and plugging of the charge plug control devices of the network are awakened. The network control devices which can be awoken in the "ignition off" state are therefore switched on. The application checks whether the control device is required. If not, it is placed in an operating mode with an active module 45, wherein a microprocessor of the control device remains in a sleep mode. The information relating to the ending of the charging process, for example "charging end voltage reached" or "plug pulled out" is distributed in the network by a control device and detected by the module 45. The network can be powered down or a control device is selectively awakened in order, for example, to indicate the charging state or to perform air-conditioning of the vehicle.

Furthermore, the module 45 comprises a first digital output interface DA1 for outputting signals to the external voltage controllers. By means of the first digital output interface DA1 it is possible, for example, for signals for switching off external voltage regulators of the control device peripherals such as, for example, power drivers, to be transmitted from the module 45 to the device peripherals in a data-exchanging fashion.

Furthermore, the module 45 comprises a second digital output interface DA2 for outputting signals to the transceiver 40 (see FIGS. 2b, 2c). By means of the second digital output interface DA2 it is possible to be transmitted from the module 45 to the transceiver 40 in a data-exchanging fashion, for the purpose, for example, of controlling the operating modes of the transceiver 40.

On the output side, the module 45 is connected in a data-exchanging fashion to the microprocessor 30 which is also illustrated in FIG. 2b and FIG. 2c. In this context, the term connection also includes the integration of the module 45 into the microprocessor 30. A signal for switching over operating mode is output if a configured message, i.e. a message with a predetermined identifier, is received or a configured message is not received over a predetermined time (timeout) or a configured message is received and the number of data bytes is lower than the number stored in the DLC mask M_DLC or a configured message is received and a comparison of the data content to determine whether it is the same as or larger than or smaller than the data mask M_data is positive or a timeout timer T1, T2 reaches the predetermined value or the value 0 or a predetermined number of reception messages has been received or an external signal has been transmitted to the module 45 by means of the input and output interface I/O.

For this purpose, the module 45 comprises an OR block 60 which is connected in a data-exchanging fashion to the reception buffers EB1, EB2, . . . EBn. Furthermore, the OR block 60 is connected in a data-exchanging fashion to the masks M_DLC, M_data, to the timeout timers T1, T2, to the third timeout timer T3, to the counter C and to the input and output interfaces I/O. In this context, data connections can be configured between the OR block 60 and the elements cited above, which is represented schematically by switches.

The invention claimed is:

1. A control device for a vehicle network that includes at least one bus system, the control device comprising:
a microprocessor;
a transceiver; and
a module that detects network messages that include vehicle velocity data, the network messages being transmitted on at least one bus system, the module controlling at least one of switching on or off of a sleep mode for the control device based on content of the detected network messages,
wherein the content indicates a previously defined state or event during the operation of the motor vehicle,
wherein the control device is switched off or into a sleep mode based on detection of the previously defined state or event during the operation of the motor vehicle, and
wherein the previously defined state is the vehicle velocity V, wherein if $V>V_{limit}$, the control device is switched off or switched into the sleep mode
wherein the module comprises at least one counter (C), wherein an operating mode is switched over if the counter (C) reaches a predetermined value.

2. The control device as claimed in claim 1, wherein the event that triggers switching the control device into the sleep mode or for switching off or for awakening is receipt of at least one network message.

3. The control device as claimed in claim 1, wherein the module is connected on an input side to an output of a receiver of the transceiver and on an output side to the microprocessor or a control logic of the transceiver or a driver of the transceiver.

4. The control device as claimed in claim 1, wherein the module is integrated into the transceiver or into the microprocessor or is embodied as a separate component.

5. The control device as claimed in claim 4, wherein the module is integrated into the microprocessor and a coprocessor function of the microprocessor is executed by the module if a sleep mode of the microprocessor is activated, wherein, in the coprocessor function, the module carries out a transmitting operation or a receiving operation or an evaluation of reception messages or a changeover of operating mode.

6. The control device as claimed in claim 1, wherein the module comprises at least one data mask (M_data) or at least one DLC mask (M_DLC) or at least one identifier mask (M_id1, M_id2, M_idn).

7. The control device as claimed in claim 1, wherein the module comprises at least one input and output interface (I/O), wherein external signals are received or transmitted by the input and output interface (I/O).

8. The control device as claimed in claim 1, wherein the module comprises at least one output interface (DA1) for outputting signals to external voltage controllers or at least one output interface (DA2) for outputting signals for controlling the transceiver.

9. The control device as claimed in claim 1, wherein the module comprises at least one time out timer (T1, T2, T3), wherein an operating mode is switched over if the time out timers (T1, T2, T3) reach a predetermined value or 0.

10. The control device as claimed in claim 1, wherein the module comprises at least one reception buffer (EB1, EB2, EBn) or at least one transmission buffer (SB1, SBn), wherein messages are received by the reception buffer (EB1, EB2, EBn) or messages are transmitted by the transmission buffer (SB1, SBn).

11. A method for operating a vehicle network that includes at least one bus system that includes a plurality of control devices, each control device comprising a microprocessor, and a transceiver, the method comprising:
    detecting a network message including vehicle velocity data, the network message being transmitted on the at least one bus system using a network message detection module;
    controlling at least one of switching on or off of a sleep mode for at least one control device of the plurality of control devices based on content of the detected network messages that indicates a previously defined state or event during motor vehicle operation; and
    switching off the at least one control device or switching the at least one control device into a sleep mode based on detection of the previously defined state or event during operation of the motor vehicle,
    wherein the previously defined state is the vehicle velocity V, wherein if $V > V_{limit}$, at least one control device is switched off or switched into the sleep mode,
    wherein an operating mode is switched over if a counter (C) reaches a predetermined value.

12. The method as claimed in claim 11, wherein a master control device transmits, as an event, a network message as a function of which at least one control device is switched off or switched into the sleep mode or awakened.

13. The control device of claim 1, wherein the control device is awakened from the sleep mode or switched on based on detection of the previously defined state or event during the operation of the motor vehicle.

14. The method of claim 11, further comprising switching on the control device or waking up the control device from the sleep mode based on detection of the previously defined state or event during operation of the motor vehicle.

15. A control device for a vehicle network of a motor vehicle, the vehicle network including at least one bus system, the control device comprising:
    a microprocessor;
    a transceiver; and
    a module that detects transmitted network messages that include vehicle velocity data, the network messages being transmitted on the at least one bus system,
    wherein the control device is switched on or off of a sleep mode based on content of a detected network messages, wherein the content of the detected network message indicates a previously defined state or event during the operation of the motor vehicle,
    wherein the control device is switched off or into a sleep mode in response to detection of a specific previously defined state or event during the operation of the motor vehicle,
    wherein the control device is switched off or into the sleep mode if:
    the previously defined state is the motor vehicle velocity and the detected velocity is greater than a specified velocity limit,
    wherein the module comprises at least one counter (C), wherein an operating mode is switched over if the counter (C) reaches a predetermined value.

\* \* \* \* \*